United States Patent [19]

Föhl

[11] Patent Number: 4,767,078
[45] Date of Patent: Aug. 30, 1988

[54] BEARING FOR THE ROTATABLE MOUNTING OF A CONTROL DISC

[75] Inventor: Artur Föhl, Schorndorf, Fed. Rep. of Germany

[73] Assignee: TRW Repa GmbH, Alfdorf, Fed. Rep. of Germany

[21] Appl. No.: 942,457

[22] Filed: Dec. 16, 1986

[30] Foreign Application Priority Data

Oct. 31, 1986 [DE] Fed. Rep. of Germany ... 8629087[U]

[51] Int. Cl.⁴ .............................................. B65H 75/48
[52] U.S. Cl. ...................... 242/107.4 R; 242/107.4 A; 384/539
[58] Field of Search .................. 242/107.4 B, 107.4 A, 242/107.4 R; 384/220, 221, 275, 295, 296, 125, 539, 903

[56] References Cited

U.S. PATENT DOCUMENTS

| | | | |
|---|---|---|---|
| 3,033,624 | 5/1962 | Biesecker | 384/125 |
| 4,230,289 | 10/1980 | Föhl | 242/107.4 B X |
| 4,277,036 | 7/1981 | Seifert et al. | 242/107.4 B X |
| 4,366,934 | 1/1983 | Seifert et al. | 242/107.4 A |
| 4,509,706 | 4/1985 | Thomas | 242/107.4 A |
| 4,624,585 | 11/1986 | Nix et al. | 384/295 X |
| 4,632,331 | 12/1986 | Bracnik | 242/107.4 A |

Primary Examiner—Stuart S. Levy
Assistant Examiner—Katherine Matecki
Attorney, Agent, or Firm—Tarolli, Sundheim & Covell

[57] ABSTRACT

A bearing for the rotatable mounting of a control disc in an automatic safety belt retractor is disclosed. The relative rotation between the belt reel and the control disc activates an emergency blocking mechanism. In order to reduce the axial dimension of the control disc, the bearing comprises a bearing journal inserted into a central bearing opening of a hub of the control disc, and one of the axial ends of the opening is widened to receive an insert having a bearing bore receiving the adjacent axial end of the bearing journal. The bearing journal has a radial shoulder and the insert has detent elements engaging behind the radial shoulder.

6 Claims, 1 Drawing Sheet

BEARING FOR THE ROTATABLE MOUNTING OF A CONTROL DISC

BACKGROUND OF THE INVENTION

The present invention relates to a bearing for the rotatable mounting of a control disc in a safety belt automatic retractor whose blocking means is controlled by the relative rotation between control disc and belt reel, comprising a bearing journal inserted into a central bearing opening of a hub of the control disc.

In the control disc of a safety belt automatic retractor known for example from German Offenlegungsschrift No. 2,823,487 a mounting is necessary which, on the one hand, opposes the rotation of the control disc on its bearing journal with the minimum possible friction but, on the other hand, keeps the axis of the control disc substantially parallel to the axis of the bearing journal to limit to a very small extent tilting movements of the control disc on its bearing journal. Since, however, for an easy-running mounting of the control disc on its bearing journal, a certain radial clearance between the outer diameter of the bearing journal and the inner diameter of the bearing opening of the control disc is necessary, tilt motions of the control disc on its bearing journal can be restricted to an acceptable extent only by making the axial length of the bearing bore large. The axial overall length of the safety belt automatic retractor is governed to an appreciable extent by the axial length of the bearing of the control disc. The axial length of the safety belt automatic retractor is however additionally increased by the free end of the bearing journal of the control disc projecting beyond the outer side face thereof and carrying a collar or similar stop for limiting the axial movement of the control disc.

SUMMARY OF THE INVENTION

A primary object of the invention is the provision of a bearing for the rotatable mounting of a control disc of a safety belt automatic retractor which for axial securing of the control disc on its bearing journal does not require any parts increasing the axial length of the bearing.

This is achieved according to the invention in the bearing of the type set forth above in that the bearing opening comprises at its one axial end a widening, that into said widening an insert is inserted which comprises a bearing bore receiving the adjacent axial end of the bearing journal, that the bearing journal in its region lying between the two axial ends of the hub of the control disc has a radial shoulder and that the insert has at least one detent element engaging behind the radial shoulder. The axial securing of the control disc on its bearing journal is thus disposed between the two axial ends of the bearing bore and consequently does not contribute to the axial length of the bearing. The invention is based on the recognition that it suffices to mount the hub of the bearing disc only in the region of its axial ends on the bearing journal because the mounting of the control disc is not subjected to any high stresses. Between the two axial ends of the bearing there is thus adequate room available for accommodation of the means for the axial securing of the control disc on its bearing journal. A further advantage of the construction of the bearing according to the invention resides in that the means for axial securing of the control disc on its bearing journal are protected from unauthorized interventions in the interior of the hub so that destruction-free disassembly is not possible. Unauthorized interventions in the safety belt automatic retractor in the region of the mounting of the control disc are thus detectable with certainty.

A particularly small axial overall length of the control disc is achieved in an advantageous embodiment in that the outer end face of the insert and the adjacent end face of the bearing journal lie flush in a plane with the outer side face of the control disc.

For axial limitation of the movement of the control disc in the direction towards the belt reel of the safety belt automatic retractor, the bearing journal according to an advantageous further development of the invention is provided with an engagement flange for the end face of the hub of the control disc remote from the insert.

The insert is preferably formed as plastic molding integrally with the detent elements. Two detent elements are preferably disposed diametrically opposite each other.

A particularly simple assembly of the bearing of the control disc is obtained by a further advantageous embodiment of the invention. According to this embodiment the detent elements are formed generally hook-shaped and elastically resilient and are adjoined to the inner end face of the hollow cylindrical insert. The widening of the bearing opening of the hub is formed by a stepped bore into which the insert fits. The bearing opening forms at its end opposite the widening a bearing bore which receives the bearing journal and which in the axial direction inwardly is followed by a widened portion of the bearing opening which surrounds the detent elements with radial spacing and is bordered by the step of the stepped bore. For assembly, the control disc is placed on the bearing journal and thereupon the insert is simply fitted onto the end of the bearing journal and pressed into the widening of the bearing opening, the detent elements snapping behind the radial shoulders of the bearing journal. Thereafter a destruction-free disassembly is not possible.

BRIEF DESCRIPTION OF THE DRAWINGS

Further objects and features of the invention will become apparent from the following description of a preferred embodiment of the invention with reference to the drawings, wherein.

DESCRIPTION OF THE PREFERRED EMBODIMENT

Figure 1:
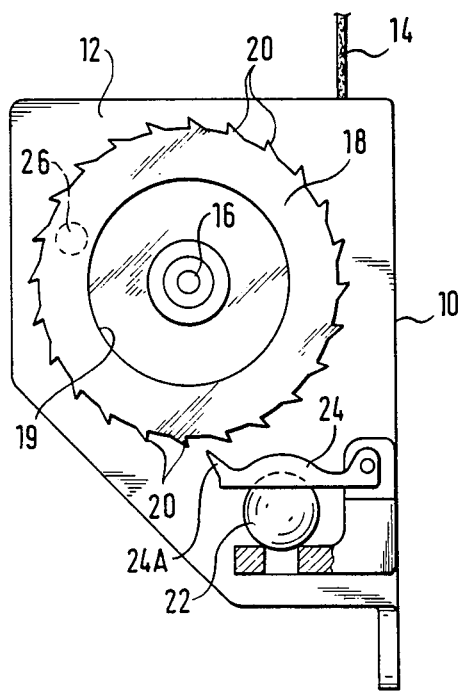
FIG. 1 is a schematic side elevation of a safety belt automatic takeup means with a control disc mounted thereon.
Figure 2:
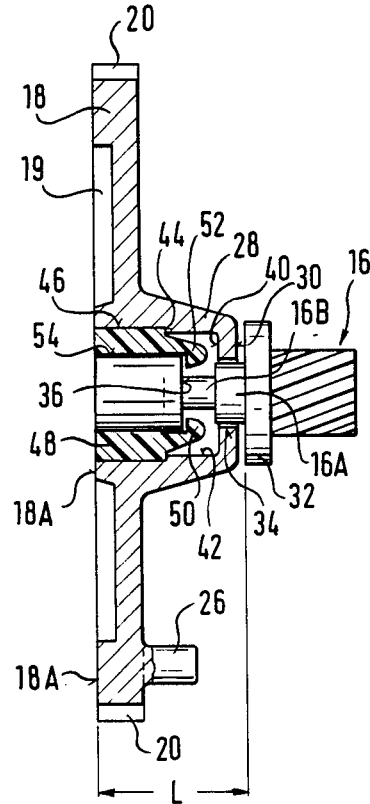
FIG. 2 is a sectional view of the embodiment of the bearing of the control disc.
Figure 3:
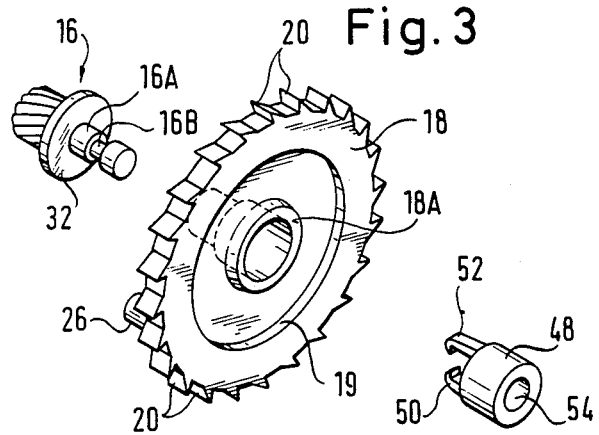
FIG. 3 is an exploded view of control disc and bearing.

In FIG. 1 only the parts of a safety belt automatic retractor necessary for the explanation of the invention are illustrated. The retractor comprises a U-shaped frame 10 between side walls 12 of which a belt reel (not shown) is rotatably mounted on which webbing 14 is wound. Into one axial end of the belt reel a bearing journal 16 is inserted which is part of a bearing for rotatable mounting of a control disc 18. The control disc 18 is provided at its outer periphery with control teeth 20 which cooperate with a vehicle-sensitive trigger mechanism which is formed by a mass ball 22 and a lever 24 pivotally mounted on the housing 10 and controlled by the ball. The nose 24A formed at the free end of the lever 24 can be raised by the movement of the mass ball 22 and then moved into the path of movement of the control teeth 20, the rotational movement of the control disc 18 thereby being stopped. By the then occurring relative rotation between control disc 18 and belt reel a blocking means (not shown) is driven, for example via a control pin 26 secured to the control disc 18, for blocking the belt reel against further withdrawal of the webbing. The control disc 18 also acts as inertia disc for the webbing-sensitive triggering. By an annular turned recess 19 its effective inertia mass is displaced to the outer periphery.

The control disc 18 is provided with a hub 28 which projects on one side and the inner end face 30 of which, i.e. the face facing the belt reel, comes to bear on an engagement flange 32 of the bearing journal 16. Extending inwardly from the radial end face 30 is a cylindrical bearing bore 34 whose inner diameter is somewhat greater than the outer diameter of the portion 16A of the bearing journal 16 accommodated therein. This portion 16A of the bearing journal 16 is followed by a tapered portion 16B which is bordered by an annular radial shoulder 36. Connected to the bearing bore 34 via an annular radial shoulder 40 is a widened portion 42 of the bearing opening which surrounds the bearing journal 16 with radial spacing. This widening 42 of the bearing opening is defined by the step 44 of a stepped bore 46. Said stepped bore 46 forms a widening of the bearing opening on the outer side of the control disc 18, i.e. the side remote from the belt reel. Inserted with relatively tight fit into the widening formed by the stepped bore 46 is a hollow cylindrical insert 48 at the inner end face of which two diametrically opposite detent elements 50, 52 constructed as resilient hooks are formed. Both an interference fit and a press fit would satisfy the relatively tight fit requirement. The detent elements 50, 52 are formed integrally with the insert 48 as plastic molding. The hooks formed at the free ends of the detent elements 50, 52 engage behind the radial shoulder 36 of the bearing journal 16. The insert 48 comprises a bearing bore 54 for the adjacent end of the bearing journal 16. It is apparent that the axial length L of the bearing is not increased by the detent elements 50, 52 cooperating with the radial shoulder 36 of the bearing journal 16 because said elements are disposed within the hub 28. In the embodiment shown the outer end face of the insert 48 and the adjacent end face of the bearing journal 16 lie flush in a plane with the outer side face 18A of the control disc 18, thereby ensuring a minimum extent of the axial length L.

What is claimed is:

1. In an automatic safety belt retractor comprising a rotatable reel on which seat belt webbing is wound and blocking means for blocking rotation of the reel in the direction of withdrawal of the seat belt webbing, control means operatively associated with the blocking means for actuating the blocking means, said control means comprising:
    a control disc rotatable with and relative to the reel and comprising a hub having opposite inner and outer end portions defining a central bearing opening therebetween, said central bearing opening having an enlarged portion at the outer end portion of said hub;
    a bearing journal for supporting said control disc for rotation, said bearing journal being received in said central bearing opening and having an engagement flange for engaging and supporting the inner end portion of said hub for rotation, an axial end spaced from said engagement flange and an axial end face on the axial end of the bearing journal; and
    an insert received in said enlarged portion of said central bearing opening and supporting said control disc and blocking axial movement of said control disc relative thereto, said insert having a bore for receiving said axial end of said bearing journal and an outer axial end face lying flush in a plane with the outer end face of the outer axial end portion of said hub, the axial end face of said axial end of said bearing journal being located in said plane, said bore being defined by a cylindrical surface engageable with said axial end of said bearing journal,
    said bearing journal having a radial shoulder located within the axial extent of said hub, and said insert having at least one detent element engaging said radial shoulder to prevent axial movement of said outer axial face of said insert and thereby the outer end face of said hub outward of said plane.

2. In a retractor according to claim 1, wherein the insert comprises two diametrically opposite detent elements.

3. In a retractor according to claim 2, wherein the detent elements are formed integrally on the insert.

4. Bearing according to claim 3, wherein the insert is integrally formed with the detent elements as a plastic molding.

5. In a retractor according to claim 2, wherein the detent elements are made of an elastically resilient material.

6. In a retractor according to claim 1 wherein a shoulder on said control disc is located in said central bearing opening, said one detent element comprises a hook-like detent element formed on the axial inner end face of said insert, and said central bearing opening has a portion spaced axially inward of said shoulder and surrounding said one detent element with radial spacing.

* * * * *